May 6, 1952          G. WEISS          2,596,000
FLUID MOTOR OPERATED TOY VEHICLE
Filed July 20, 1946          5 Sheets-Sheet 1
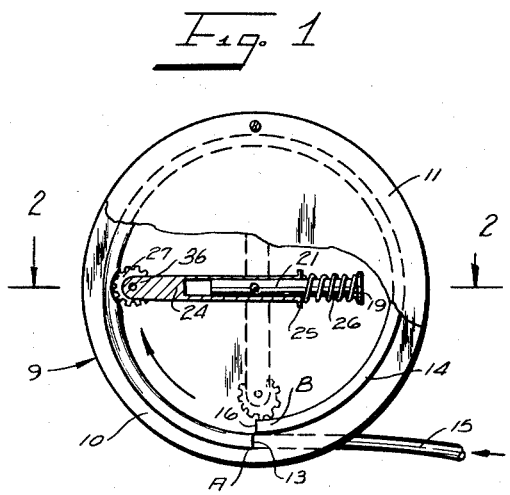
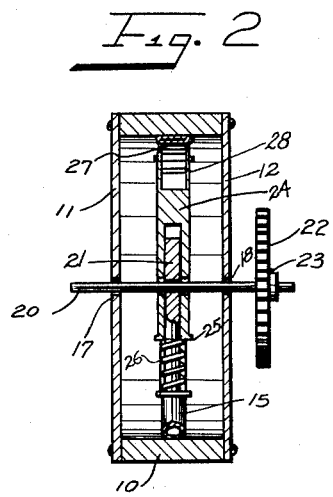
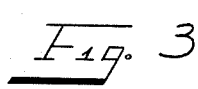
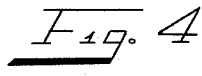
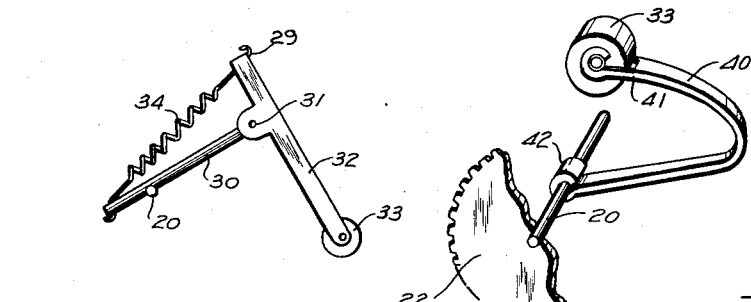
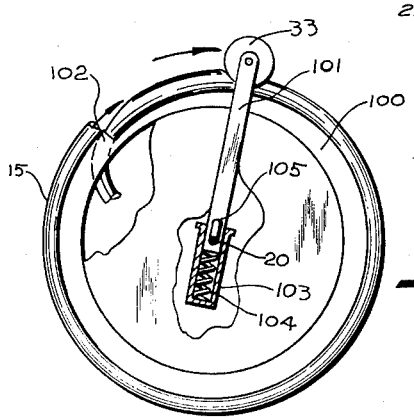
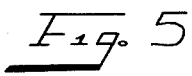
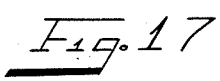
INVENTOR.
GERHART WEISS
BY Orville N. Greene
ATTORNEY

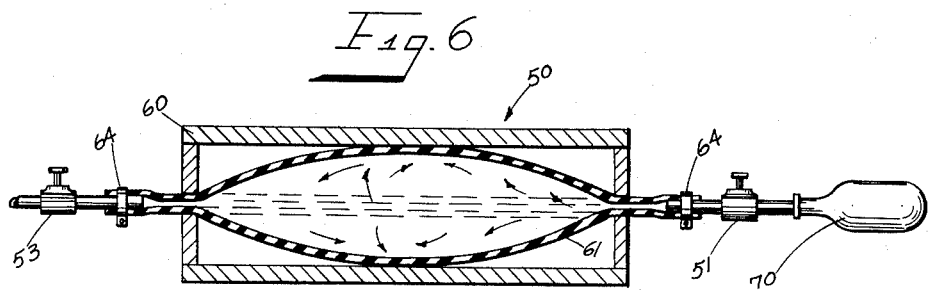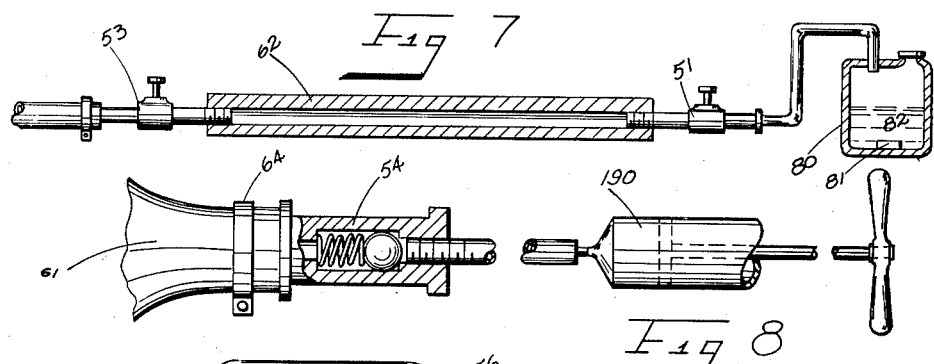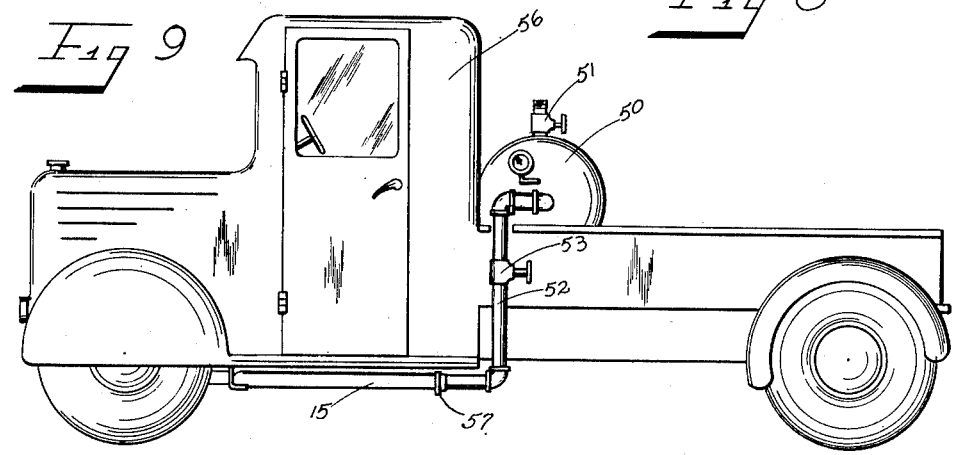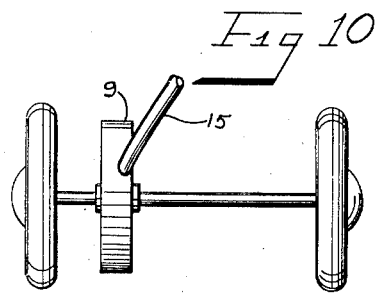

May 6, 1952          G. WEISS          2,596,000
FLUID MOTOR OPERATED TOY VEHICLE
Filed July 20, 1946          5 Sheets-Sheet 3
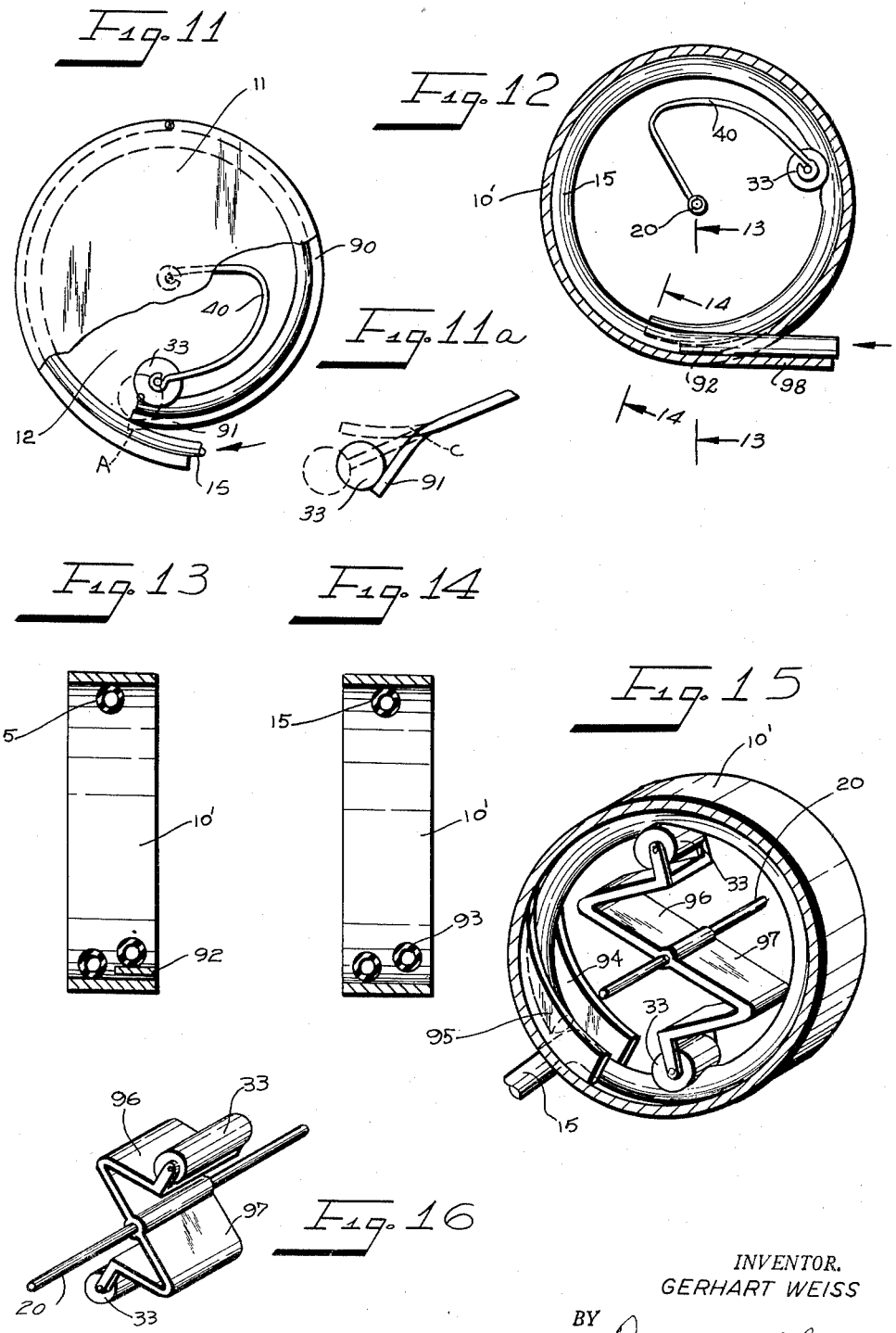
INVENTOR.
GERHART WEISS
BY
Orville N. Greene
ATTORNEY May 6, 1952            G. WEISS            2,596,000
FLUID MOTOR OPERATED TOY VEHICLE
Filed July 20, 1946            5 Sheets-Sheet 4
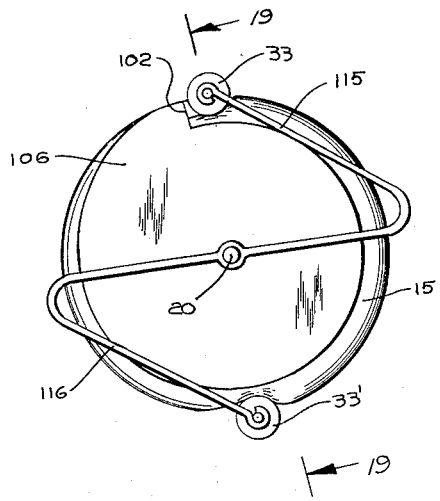
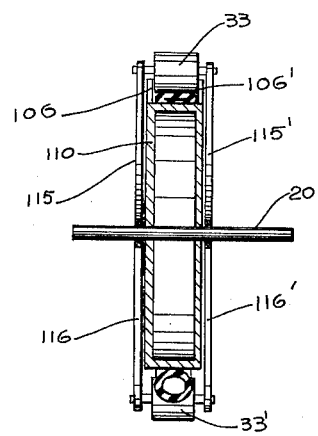
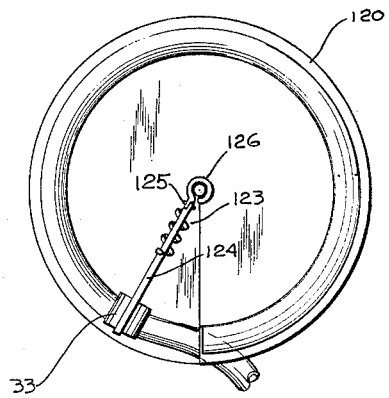
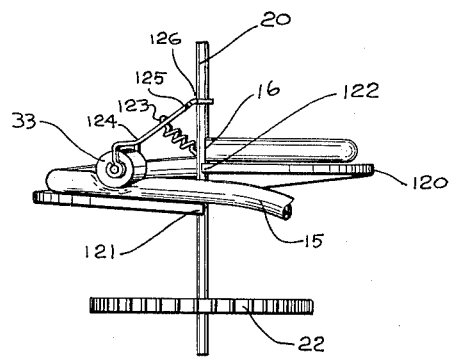
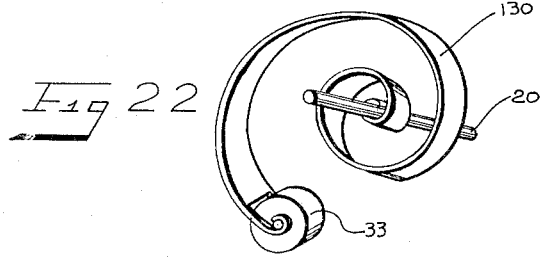
INVENTOR.
GERHART WEISS
BY Orville N. Greene
ATTORNEY May 6, 1952 G. WEISS 2,596,000
FLUID MOTOR OPERATED TOY VEHICLE
Filed July 20, 1946 5 Sheets-Sheet 5
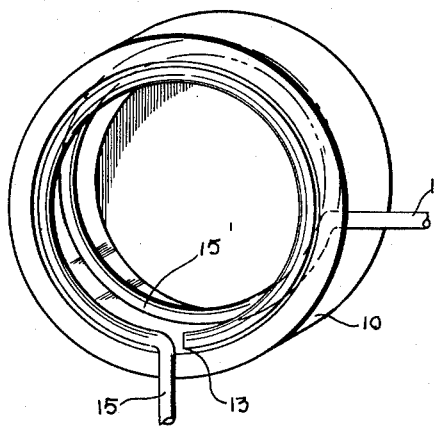
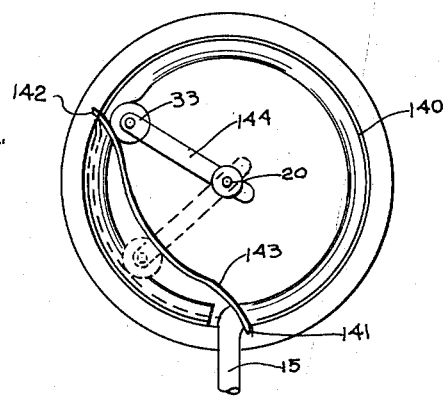
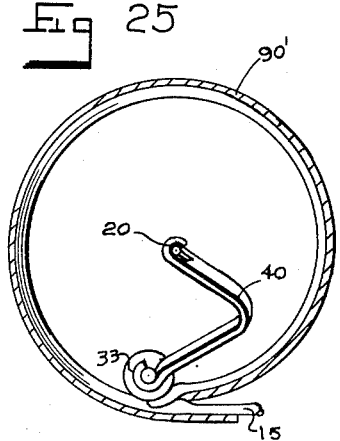
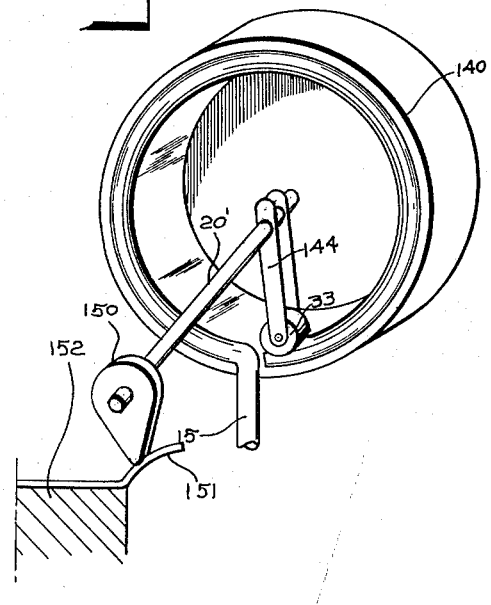
INVENTOR.
GERHART WEISS
BY *Orville N. Greene*
ATTORNEY Patented May 6, 1952

2,596,000

UNITED STATES PATENT OFFICE 2,596,000

FLUID MOTOR OPERATED TOY VEHICLE

Gerhart Weiss, Long Island City, N. Y.

Application July 20, 1946, Serial No. 685,218

17 Claims. (Cl. 46—111)

This invention relates to a fluid type of toy propulsion means.

More particularly the invention relates to a fluid type of toy propulsion means in which a fluid is forced under pressure through an open end tube having collapsible walls, the flow of the fluid in the tube serving to drive one or more relatively frictionless members, such as rollers for example, which press against the collapsible tube. The fluid discharges from time to time from the open end of the tube and the rollers and tube are so mounted that the rollers describe a circuitous path.

It is a particular feature of the device of the present invention that in operation it produces a combination of sounds that is extremely advantageous as it simulates the "put-put" sound of a combustion engine. The device of the present invention is especially adapted for driving toys which are modeled from such engine driven carrier devices as automobiles, airplanes, motor boats, etc. The total sound effect emitted by the device of the present invention appears to be the result of a combination of at least two sounds, first, the sound produced by the intermittent exhaust of the fluid air employed to operate a motor and second, the clicking sound which is the result of the particular structure of the present device which is employed to start the rotor in each of its cycles and prevent it from stalling in operation.

Devices of this general type are known in the art. However, in all of such devices (as well as in reciprocating fluid and gas engines) there is at least one particular spot where the roller being driven by the fluid is not subjected to any pressure differential or at least is subjected to very little pressure differential. This low pressure spot is usually at the point where the roller recontacts the forward end of the pressure tube where the pressure tube enters the casing and is first engaged by the roller. The reason for this spot of low pressure differential will be more fully described in connection with the description of Figure 1 below.

An object of this invention, therefore, is to produce a toy device of the type which is driven by a fluid passing through a tube with collapsible walls and which contains no dead pressure spots.

Still another object of this invention is to produce a toy device of the type described which will, in operation simulate the sound of a combustion type engine.

Still another object of this invention is to produce a rotary type toy device wherein the rotor drive rides on a track which contains an abrupt step so that the rotor drive will produce a clicking sound and simultaneously release a certain amount of fluid to thereby simulate the "put-put" sound of a combustion engine.

Another object of this invention is to produce a toy device of the type described which is self-starting from any position of the rotor.

Another object of this invention is to produce a fluid driven toy device of the type described which will not stall as long as the fluid supply lasts.

A very important object of this invention is to produce a toy device of the type described which is of small size, of simple construction, and which is especially suitable for the driving of mechanical toys.

The novel features characteristics of this invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a side view, partly cut away, of one form of the present invention.

Figure 2 is a cross sectional view taken along line 2—2 of Figure 1.

Figure 3 is a view showing a modified form of pressure arm.

Figure 4 shows another modification comprising a third type of pressure arm.

Figure 5 is a view similar to Figure 4 but showing a different type of contact roller.

Figure 6 is a view showing an accumulator device especially suitable for use with the toy device of the present invention.

Figure 7 is a view similar to Figure 6 but showing a different type of accumulator device.

Figure 8 is a detail view showing a modified valve construction and a pump mechanism for supplying fluid.

Figure 9 is a view illustrating how the device of the present invention is applied to a mechanical toy.

Figure 10 is a detail view of Figure 9 showing how the device of the present invention is attached to the toy of Figure 9.

Figure 11 is a side view, partly cut away, of a modified form of the toy device.

Figure 11a is a detail of the apparatus of Figure 11.

Figure 12 is a side, cross-sectional view of another form of the toy device.

Figure 13 is a cross-sectional view taken on line 13—13 of Figure 12.

Figure 14 is a cross-sectional view taken on line 14—14 of Figure 12.

Figure 15 is a perspective view, partly in section, of another form of the apparatus.

Figure 16 is a perspective view of the rotor of Figure 15.

Figure 17 is a side view of still another form of the device.

Figure 18 is a side view of another form of the apparatus.

Figure 19 is a cross sectional view taken on line 19—19 of Figure 18.

Figure 20 is a plan view of another form of the device.

Figure 21 is a side view of the apparatus of Figure 20.

Figure 22 is a perspective view of another type of rotor.

Figure 23 is a side view of another type of toy device.

Figure 24 is a perspective view of still another type of toy device.

Figure 25 is a cross-sectional view of a modified construction, similar to that of Figure 11.

Figure 26 is a perspective view of another modification of the toy device.

In the drawings the toy propulsion means is designated by 9 and in general it comprises a casing 10 which may be generally circular on the outside as shown in Figure 1 but it has an inside track 14 which is in the shape of a spiral having a low pitch. It is equipped with side plates 11 and 12, the side plates 11 and 12 having orifices 18 and 17 which serve at bearings for the shaft 20 which is centrally arranged with respect to the outside circumference of the casing 10. The shaft 20 is driven by the rotor and may be attached to any suitable driving mechanism such as a gear wheel 22. The gear wheel 22 is shown as being attached to the shaft 20 by a screw 23. The flexible tube, through which the fluid under pressure flows, is shown at 15 and is attached to the inner spiral-like circumference of the casing 10. The end of the tube 15, which is shown at 16, is at the innermost portion of the spiral. This curve on the inside of the casing 10 terminates in a radial step shown at 13. Thus, the fluid first enters the inside of the casing 10 at the point 13 and leaves the tubing 15 at the point 16.

The flow of the fluid through the tube 15 is made to drive the radial shaft 24 by pushing against the roller 27 which is releasably pressed against the side wall of the tube. Various means may be employed for releasably pressing the roller against the collapsible tube and the means shown in Figure 1 comprises a pin 21 which is attached to the shaft 20 at a point intermediate its ends. The pin 21 is keyed or otherwise attached to the shaft 20 so that rotation of the pin causes rotation of the shaft 20. The pin 21 has a shoulder 19 at one end to hold a spring 26 in position. Loosely mounted about the pin 21 is the member 24. The member 24 is slotted at the sides surrounding the shaft 20 so that it may move transversely of the shaft. Member 24 also contains a shoulder 25 at one end which is adapted to bear against the inside end of the spring 26. At the other end of the member 24 there is mounted a roller 27 in a slotted portion 28. The spring 26 is adapted to force member 24 away from the shaft 20 and against the collapsible tube 15. In Figures 1 and 2 the roller 27 is shown as being a gear or fluted type roller. Any type of roller against which the tube 15 would apply any pressure or any other relatively frictionless member could be used in place of the roller 27. The gear or fluted type roller, however, has at least one advantage in that it has a smaller area of contact with the tube and therefore compresses the tube more effectively.

When the roller 27 is pressed against the tube 15 and fluid pressure is applied in the tube the diameter of the tube immediately behind the roller is increased to a somewhat greater degree than that of the remainder of the tube. This "bubble" of increased diameter immediately back of the roller increases the push against the roller.

Before describing how the device of Figures 1 and 2 operates the operation of a device which does not contain the spiral track will be described. If, for example, the roller 27 is at point A and pressure is then applied to the tube 15 the pin 21 and the shaft to which it is attached will be rotated until the roller reaches the point B. At this point, assuming that the points A and B are on the same level as in the prior art devices, the pressure tending to force the roller past the point B is just equal to the pressure which the roller must overcome to move past the point A. Therefore, unless considerable momentum has been gained so that the inertia of the assembly of 21, 24, 36 and 27 is sufficient to overcome the pressure at A the roller will not move past the point A. Also, in such cases the roller 27 may be forced inwardly against the action of the spring 26 thereby permitting the fluid to escape and resulting in a loss of power. This would be particularly true of small propulsion means, such as those of the size employed in mechanical toys, as in these the driving elements such as 21, 24, 36, 27 and so forth, must be made very light and small and they, therefore, will not have any great amount of inertia. Furthermore the efficiency of a toy device of this type is greatest at relatively low speed primarily because there is a considerable amount of friction between the various parts, and by reducing the speed to gain efficiency the inertia of the rotor is still further reduced.

By providing the spiral shaped track with the sudden step 13 this difficulty is obviated according to the present invention. For example, if the roller 27 is at point A when the pressure is turned on the roller will proceed to point B. Then the roller will be suddenly and positively forced against the tubing 15 at the point A just after it leaves the point B. No portion of the tubing 15 at the point A will contact the roller 27 until after it has left the point B. In addition, because of the action of the spring 26, the roller 27 will be forced against the tubing 15 at the point A with considerable more force than is required to retain the roller against the tube 15. On the one hand, the spring 26 may be looked upon as a kind of storage device which gradually stores a small portion of the energy of the moving fluid (because of the spiral shaped track) and releases this energy suddenly when it is once again necessary to compress the tubing 15 at the point where the tube enters the casing 10. The roller 27 is thus forcibly pressed against the tubing 15 so that there is no leakage of the fluid due to the fact that the tubing is not completely collapsed.

On the other hand the spiral track may be looked upon as a valve mechanism which permits the spring pressed roller to move past the point where the pressure tubing enters the casing so that the roller in its rotary path is moved past the dead zone at A and then pressed radially against the expanded tubing and so that the "bubble" of increased diameter is permitted to develop in such a position to push tangentially against the roller.

This construction of the spiral track with the abrupt step produces another novel effect. The roller in dropping from the top of the step on to the inflated tube produces a sound (which is apparently a combination of the sound produced by the clicking of the roller against the bottom of the step and the sound caused by the sudden release of the air pressure in the portion of the tube in the casing) which simulates the "put-put" of a combustion type of motor.

In the modification shown in Figure 3 a different type of spring pressed roller is shown. In this modification a strip or rod 30 is attached intermediate its ends to a portion of the shaft 20. Pivotally mounted at one end of the rod 30 is the member 32. This member 32 may be pivotally mounted intermediate its ends as by pin 31. The member 32 is bifurcated at one end and carries a roller 33. At the other end a spring 34 is attached at 29 to force the roller 33 away from the shaft 20.

According to the arrangement shown in Figure 4 there is attached to the shaft 20 (as at 42) a strip of spring material 40. This spring strip is bent into generally a U or V shape and at its other end is mounted a roller 33.

In Figures 3 and 4 the roller 33 is shown as a smooth surface roller. The roller may also be a gear-like or fluted roller 27 such as shown in Figure 5 or in Figures 1 and 2.

There is disclosed in Figure 9 one method of applying the air motor of the present invention to a mechanical toy. The complete propulsion means for the toy would comprise, for example, an accumulator tank 50 having a feed valve 51 and outlet line 52 preferably including a valve 53. The outlet line 52 is attached as at 57 to the tubing 15 of the fluid propulsion means. The mechanical toy shown is a truck having a body 56. The complete toy might also include a means for charging the accumulator. The charging means may take the form of a common air pump, a gas generating chemical, an explosive or a small carbon dioxide containing capsule.

In Figure 6 one type of accumulator is shown in detail. This comprises an inner flexible tube 61, preferably of rubber, and an outer restraining member 60 which may be of metal, resin, leather or any strong nonelastic material. The inner tube 61 is attached to inlet and outlet tubes by a suitable means, such as by clamps 64. At 70 there is shown the capsule type of charging device.

Figure 7 discloses another type of accumulator device and in this figure the accumulator 62 is a thick walled rubber tube. At 80 in Figure 7 there is shown a chemical type of charging means. For example, this may comprise a sealed vessel containing a liquid 82, such as acid, into which may be inserted a gas generating chemical 81, such as sodium bicarbonate.

In Figures 6 and 7 the valves 51 and 53 are disclosed as hand operated valves. The valve 51, however, may be of the automatic type such as is illustrated in Figure 8 at 54. In Figure 8 there is also disclosed how a simple conventional type air pump, such as a bicycle pump 190, can be employed to charge the accumulator.

According to the showing in Figure 10 the device may be attached directly to the axle of the toy automobile. It is obvious, however, that the device may be employed to drive a gear which in turn would drive a gear which is keyed to the axle of the automobile.

In the form of the device shown in Figures 11 and 11a a spiral track 90 is attached to side walls 11 and 12. The side walls 11 and 12 may conform exactly to the size of the spiral track 90, but this obviously is not necessary. The sides of the track 90, however, are integrally attached as by welding or soldering to the side walls 11 and/or 12, except for the portion 91. The portion 91 is not fixed with respect to the side walls so that this portion will be flexible.

The effect of making the portion 91 flexible is shown in exaggerated form in Figure 11a. As the spring pressed roller 33 travels toward the end of the portion 91 it forces the portion 91 downwardly. When the roller 33 is about to the end of the portion 91 the spring action of this portion flips the roller 33 forwardly and past the dead point A (Figure 11). It is apparent that various methods may be employed to make the end portion 91 flexible.

In the modification shown in Figures 12 to 14 the track 10' is substantially circular except that it contains an insert 92 (see Figure 13) and a tangential extension 98. This insert 92 lifts the open end of the tube 15 above that portion of the tube which first enters the cylinder. In this modification also it is preferred that a small amount of tubing 93 extend beyond the stepped portion at 92.

In place of one roller a plurality of rollers 33 may be attached to the shaft 20 and these rollers are preferably, though not necessarily, equally spaced about the shaft. In Figures 15 and 16 the track 10' is circular and the rotor has two spring pressed rollers 33, substantially 180° apart. In order to obtain a step arrangement to guide the rotor past the dead point side partitions 94 and 95 are attached to guide the rotors off of the open end of the tube. In this type of apparatus it is necessary to use more than one pressure roller as it will be seen that when one roller is riding on the partitions 94 and 95 the escape of the pressure fluid is prevented only by the second or other rollers. The rollers in Figures 15 and 16 are pressed against the tubing by the spring action of members 96 and 97.

The pressure tube 15 may also be applied to the outside of the spiral track as shown in Figures 17 to 19. Figure 17 shows a one pressure-roller type of device. Pressure roller 33 of Figure 17 is held by a pair of arms 101. These arms are slotted as at 105 and are adapted to slide in the sleeve 103 which is integrally attached to the shaft 20. The roller 33 is held against the tube 15 by the tension spring 104, one end of the spring being attached to the sleeve 103 and the other end being attached to the arms 101. Although it is possible that a single arm 101 could be employed it is preferred to employ an arm on each side of the roller 33.

In Figures 18 and 19 a two roller rotor type of apparatus is shown. In this apparatus the rollers 33 and 33' are pressed against the tube 15 by the action of the spring members 115, 115', 116 and 116' which are attached to the shaft 20. The track on which the tube 15 is held is substantially cylindrical but comprises the side wall portions 106 and 106'. These side wall portions 106 and 106' lift the rollers 33 and 33' away from the tube 15 just before the rollers reach the step 102. In passing the step 102 the rollers 33 and 33' are forced by the spring action against the tube 15 and thus the dead point is eliminated. The step at 102 as shown in Figures 17 and 18 and the step 13 as shown in Figure 1 are both substantially radial to the shaft 20. However, it is understood the step need not be this sudden to obtain the desired result. That is, a slightly sloped step may be employed.

Another form of the invention is shown in Figures 20 and 21. In this form the tube 15 is placed upon a disc-like member 120. This disc-like member 120 is slit radially and forced apart at the radial slit so as to produce a separation between the portions 121 and 122. The disc member 120 is held in position with respect to the shaft 20 by any suitable means not shown. The shaft 20 is rotatable relative to the disc 120. Attached to the shaft 20 is an arm 124. This arm 124 is made pivotable with respect to the shaft 20 by any suitable means as by making the arm 124 in two pieces, one end being attached to the shaft 20 as at 126. The other end is free to move up and down by making the pivot connection shown at 125. The spring 123 is attached at one end to the arm 124 and at the other end to the shaft 20 so as to force the roller 33 (attached thereto) against the tube 15. This device operates to remove the dead point by storing sufficient energy in the spring 123 so that the roller 33 as it passes the end 122 is forced suddenly against the tubing next to the end 121. The shaft 20 of Figure 21 may be used to operate a toy from the attached gear 22.

Figure 22 shows another type of spring pressed rotor adapted to be employed in Figures 1, 2, and 11 to 14, for example. In this modification, the spring 130 is the common spiral spring. The spring 130 is attached to the shaft 20 at one end and acts as a bifurcated element to hold the roller 33 at the other end.

Although certain specific embodiments of this invention have been shown and described, it will be understood that many modifications thereof are possible.

The air may be forced through the tube by a vacuum rather than by positive pressure. If the inner chamber of Figure 1, for example, is made air tight and a vacuum is applied to this chamber, the device will operate by atmospheric pressure just as if pressure were applied to the tube 15. Although the device is primarily designed for toy operation where the simulated sound of a combustion engine is desirable, it may be used to operate other devices where a small amount of power is required. For example, in a chemical laboratory it may be employed in stirring or shaking apparatus. Where no pressure line is available, the device may be designed to operate from a vacuum produced by the common faucet attachment ordinarily employed in chemical laboratories. It is understood, therefore, that the term "toy" does not limit the invention to employment with toys.

It is also possible to store up energy in the rotating shaft 20 without employing the stepped arrangement of Figure 1, for example. Two means by which this may be done are shown in Figures 23 and 24.

In Figure 23 the roller 33 is mounted upon an inflexible arm 144 and this arm is mounted to pivot on the shaft 20 and about the circular track 140. Adjacent the tube 15 which is mounted in the circular track, the spring 143 is mounted. One spring 143 may be employed or a pair of springs one on each side of the tube 15 may be employed. The spring 143 does not extend over the top of the tube 15. The tube 15 is mounted in a notch 141 near the point where the tube enters the track and in the notch 142 spaced backwardly relative to the direction of motion of the arm 144.

The modification shown in Figure 23 operates as follows. The arm 144 is rotated by the fluid pressure in the tube as in the previous devices. When the roller 33 reaches the point opposite the notch 142 it begins to compress the spring 143 and to force the spring 143 against the track 140 thereby storing energy in the spring 143. After the roller 33 has reached the point shown approximately in the dotted lines of Figure 23 the spring 143 begins to urge the arm 144 away from the tube and the track and as the roller 33 passes to the end of the tube 15 the strength of the spring 143 is sufficient to flip the roller 33 against the tube 15 opposite the point 141 and thereby start a second revolution of the arm 144.

In Figure 24 there is attached to the shaft 20 an auxiliary shaft 20' which has attached thereto a cam 150. This cam 150 bears against a spring 151 which is suitably attached to some stationary structure 152. The cam 150 is so constructed that when the roller 33 reaches the dead point at the end of the tube 15, the spring 151 pushes against the cam 150 in such a way as to force the arm 144 to continue rotating. Energy is then stored in the spring 151 by further rotation of the cam 150. The amount of energy stored in the spring 151 and the portion of the rotating cycle in which energy is stored will depend upon the shape of the cam 150 and can obviously be adjusted as desired.

In Figure 25 there is shown a modification which is applicable to Figures 1, 11, 17 and 18, for example. The modification consists in increasing the length of the tube 15 so that the open end thereof extends beyond the stepped portion of the spiral track. This is sometimes desirable for the sake of efficiency and to change the sound which the device produces.

It is also possible to employ a plurality of pressure tubes. A device showing two pressure tubes is shown in Figure 26. By this arrangement the step can also be eliminated but the results obtained are not as good as with the stepped arrangements and the other means of storing energy in the rotating shaft. When a plurality of pressure tubes are used the points where the various tubes enter the track are spaced apart so that the various dead points in the individual tubes tend to nullify each other. In Figure 26 the first tube 15 enters the bottom of the track as shown in the figure. The second tube 15' enters the track at a point spaced about 90° from that where the first tube enters. It is obvious, however, that any desired amount of spacing may be employed. Preferably when employing a plurality of pressure tubes the rotating arm will carry one roller for each tube rather than a single elongated roller to extend across all the tubes.

It is also possible to obtain a stepped arrangement similar to that of Figure 1, for example, by inserting in a circular track a tube which has a bottom wall with a gradually increasing thickness.

I wish it to be understood that I do not desire to be limited to the exact details of construction shown and described, for obvious modifications will occur to a person skilled in the art.

I claim:

1. In a toy device for driving a toy and simulating the sound of a combustion engine, a rotor comprising a pressure element, a substantially circular track spaced from said rotor, a collapsible tube extending around said track, said tube being open at one end and having means for forcing a fluid under pressure through said tube at said other end, said pressure element being adapted to press against and collapse a small section of said tube and means cooperating with said pressure element of said rotor adapted to move said pressure element past the dead point that occurs where the pressure end of the tube first contacts the track.

2. In a toy device for driving a toy and simulating the sound of a combustion engine, a motor comprising a yieldably-pressed pressure element, a substantially circular track spaced from said rotor, a collapsible tube extending around said track, said tube being open at one end and having means for forcing a fluid under pressure through said tube, at the other end, said pressure element being adapted to press against and collapse a small section of said tube and means cooperating with said pressure element of said rotor adapted to move said pressure element past the dead point that occurs where the pressure end of the tube first contacts the track.

3. In a toy device for driving a toy and simulating the sound of a combustion engine, a rotor comprising a shaft, a pressure element and spring means adapted to store energy between the shaft and pressure element, a substantially circular track spaced from said rotor, a collapsible tube extending around said track, said tube being open at one end and having means for forcing a fluid under pressure through said tube at the other end, said pressure element being adapted to press against and collapse a small section of said tube and means cooperating with said pressure element of said rotor adapted to store sufficient energy in said pressure element to move said pressure element past the dead point that occurs where the pressure end of the tube first contacts the track.

4. In a toy device for driving a toy and simulating the sound of a combusion engine, a rotor comprising a yieldably-pressed pressure element and a shaft, a substantially circular track spaced from said rotor, an open ended collapsible tube having its end portion extending at least once around said track, the radial distance from the shaft of said rotor to said tubing in its collapsed state varying gradually from the point where the tubing first contacts the track to the open end of the tubing so that that portion of the tube closest to the open end thereof is spaced in a radial direction from the portion of the tube which first contacts the track, and means for forcing a fluid under pressure through said tube.

5. The device of claim 4 in which the tubing is between the track and the rotor shaft.

6. The device of claim 4 in which the track is between the tubing and the rotor shaft.

7. The device of claim 1 in which the rotor carries two pressure elements and the means which cooperates with the pressure elements to move the latter past the dead point comprises a guide means which lifts the rotating pressure elements away from the pressure tubing around the dead point.

8. The device of claim 1 in which the pressure element is a roller.

9. The device of claim 2 in which the pressure element is a roller.

10. The device of claim 3 in which the pressure element is a roller.

11. The device of claim 4 in which the pressure element is a gear type roller.

12. In a toy propulsion means which is operative by the application of fluid pressure, at least one convolution of a fluid confining means forming a channel for the fluid under pressure, at least one longitudinal wall portion of said confining means being compressible and at least one longitudinal wall portion being rigidly supported, rotatable means for compressing a small transverse section of said collapsible confining means against the supporting means so that when fluid under pressure is forced into said confining means the compressing means tends to move in the same direction as the fluid in said confining means, a shaft substantially centrally located with respect to the convolution of said confining means, a yieldable connection between the rotatable compressing means and said shaft, and means cooperating with said rotatable means adapted to store potential energy and then to release said potential energy to compress the confining means at the point where the fluid enters the channel.

13. A device according to claim 12 in which the supported wall of said convolution is supported by a rigid wall having the shape of a spiral of low pitch with a radial step between the point where the fluid first enters the rigidly supported channel portion and the end of the channel convolution.

14. A device according to claim 12 in which the supported wall of said convolution is supported by a rigid wall having the shape of a helix with an offset portion between the point where the fluid first enters the rigidly supported channel portion and the end of the channel convolution.

15. In a toy propulsion means which is operative by the application of fluid pressure, at least one convolution of a fluid confining means forming a channel for the fluid under pressure, at least one longitudinal wall portion of said confining means being compressible, means for supporting the longitudinal wall of said channel opposite to the compressible wall, said supporting means being in the shape of a spiral of low pitch and said collapsible wall being on the inside of said supporting means, rotatable means for compressing a small transverse section of said collapsible confining means against the supporting means so that when fluid under pressure is forced into said confining means the compressing means tends to move in the same direction as the fluid in said confining means, a shaft substantially centrally located with respect to the convolution of said confining means and a yieldable connection between the rotatable compressing means and said shaft, said yieldable connection being adapted to store potential energy and then to release said potential energy to compress the confining means at the point where the fluid enters the channel.

16. In a toy propulsion means which is operative by the application of fluid pressure, at least one convolution of a fluid confining means forming a channel for the fluid under pressure, at least one longitudinal wall portion of said confining means being compressible, means for supporting the longitudinal wall of said channel opposite to the compressible wall, said supporting means being in the shape of a spiral of low pitch and said collapsible wall being on the outside of said supporting means, rotatable means for compressible a small transverse section of said collapsible confining means against the supporting means so that when fluid under pressure is forced into said confining means the compressing means tends to move in the same direction as the fluid in said confining means, a shaft substantially centrally located with respect to the convolution of said confining means and a yieldable connection between the rotatable compressing means and said shaft, said yieldable connection being adapted to store potential energy and then to release said potential energy to compress the confining means at the point where the fluid enters the channel.

17. In combination, a toy motor which is operable by fluid pressure, a tank for supplying fluid under pressure to said motor and a toy vehicle adapted to be driven by said motor, means for attaching said tank and said motor to said vehicle, means for supplying fluid under pressure to said tank, said toy motor comprising a rotor which includes a pressure element, a substantially circular track spaced from said rotor, a collapsible tube extending around said track, said tube being open at one end and having means for forcing a fluid under pressure through said tube at said other end, said pressure element being adapted to press against and collapse a small section of said tube and means cooperating with said pressure element of said rotor adapted to move said pressure element past the dead point that occurs where the pressure end of the tube first contacts the track.

GERHART WEISS.

REFERENCES CITED

The following references are of record in the file of this patent:

UNITED STATES PATENTS

| Number | Name | Date |
|---|---|---|
| 40,195 | Smith | Oct. 6, 1863 |
| 87,837 | Gilmore | Mar. 16, 1869 |
| 108,344 | Gilmore | Oct. 18, 1870 |
| 425,015 | Allen | Apr. 8, 1890 |
| 551,669 | Fellows et al. | Dec. 17, 1895 |
| 819,653 | Hawke | May 1, 1906 |
| 922,205 | Still | May 18, 1909 |
| 1,984,843 | Schoenfeld | Dec. 18, 1934 |
| 2,054,644 | Wulfert | Sept 15, 1936 |
| 2,314,281 | Knott | Mar. 16, 1943 |